D. SCHULER.
GARMENT STAY.
APPLICATION FILED OCT. 26, 1908.
Reissued Aug. 12, 1913. 13,604.
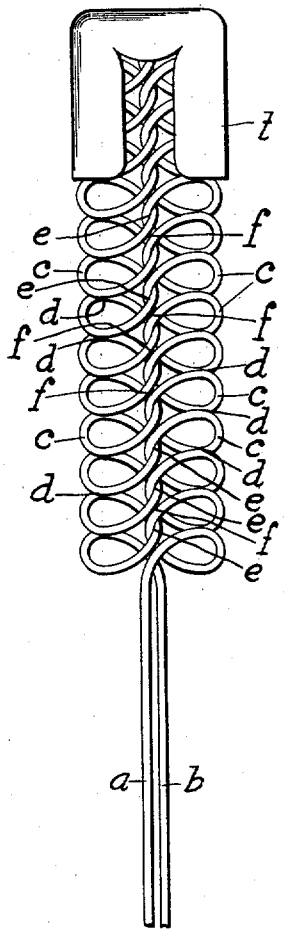
WITNESSES
Chas. Lopterman
Marie Draper.
INVENTOR
David Schuler,
By Frank H. Wilcox,
His Attorney
COLUMBIA PLANOGRAPH CO., WASHINGTON, D. C.

BEST AVAILABLE COPY

UNITED STATES PATENT OFFICE.

DAVID SCHULER, OF MEADVILLE, PENNSYLVANIA, ASSIGNOR TO THE SPIRELLA COMPANY, OF MEADVILLE, PENNSYLVANIA, A CORPORATION OF PENNSYLVANIA.

GARMENT-STAY.

13,604. Specification of Reissued Letters Patent. Reissued Aug. 12, 1913.

Original No. 868,296, dated October 15, 1907, Serial No. 345,648. Application for reissue filed October 26, 1908. Serial No. 459,659.

*To all whom it may concern:*

Be it known that I, DAVID SCHULER, a citizen of the United States, and a resident of Meadville, in the county of Crawford, in the State of Pennsylvania, have invented new and useful Improvements in Garment-Stays, of which the following, taken in connection with the accompanying drawing, is a full, clear, and exact description.

This invention relates to the class of garment-stays which are formed of interwoven coiled wires.

The invention consists in an improved construction of the coiled wires and the arrangement of the coils in relation to each other and the manner of tying said wires to each other, whereby a simple, strong and very efficient and convenient stay or stiffener for corsets and other garments is obtained.

The accompanying drawing, constituting part of this application, shows an enlarged face view of a portion of a garment-stay constructed in accordance with my invention.

—*a*— and —*b*— represent two spring wires from which the garment-stay is formed. Each of these wires is coiled in the form of a row of flat loops *c*—*c* disposed contiguously side by side and partly lapping each other in proximity to the edge of the stay as shown at —*d*— to impart to the garment-stay a sufficient stiffness to cause it to automatically resume its normal shape as soon as it is relieved from flexure in its plane.

The two wires are interwoven by the portions —*e*—*e*— between and isolated from the interior of the loops of each wire passing directly around the corresponding portion of the other wire, the loops being disposed diametrically opposite each other and bearing on the outer sides of the intertwined portions, *e*, as shown at —*f*—, thus holding said intertwined portions in tightly embracing positions. The ends of oppositely disposed loops lie side by side on the same face of the stay and abut, as at *f*, so holding the intertwined portions *e* in place. In this manner the garment-stay is formed with a longitudinal central torsional spring, which, in conjunction with the abutting loops —*c*—*c*— extending from opposite sides of said spring, imparts to the said garment-stay a spring action which allows it to accommodate itself to the various strains it is subjected to by the movements of the person wearing the garment, and to readily return to its normal shape as soon as it is relieved from said strains.

—*t*— represents one of the metallic tips attached to the ends of the stay to protect the garment from contact with the ends of the wires.

What I claim as my invention is:—

1. The improved garment-stay consisting of two spring wires, each formed into a row of flat loops partly lapping on each other in proximity to the edge of the stay, the portions between the loops being intertwined with the corresponding portions of the other wire by passing around one side thereof, and isolated from the interiors of the loops, the loops of the two wires bearing on the outer sides of the intertwined portions and holding the same in tightly embracing positions as set forth and shown.

2. An improved garment stay consisting of two spring wires, each formed into a row of flat loops with the wires in close proximity at the points of crossing, said wires being intertwined by the portions between the loops being twisted together, the ends of oppositely disposed loops lying side by side on the same face of the stay and in substantially the same plane and abutting on their outer sides, the portions between the loops being tightly intertwined and thereby holding the abutting portions in closely embracing positions and preventing the two rows of loops from being moved one within the other, substantially as shown and described.

3. An improved garment stay consisting of two spring wires, each formed into a row of flat loops each partly overlapping the other in proximity to the edges of the stay and with the wires in close proximity at the points of crossing, said wires being intertwined by the portions between the loops being twisted together, the ends of oppositely disposed loops lying side by side on the same face of the stay and in substantially the same plane and abutting on their outer sides, the portions between the loops being tightly intertwined thereby holding the abutting portions in closely embracing positions and preventing the two rows of loops from being moved one within the other, substantially as shown and described.

4. An improved garment stay consisting of two spring wires each formed into a row of flat loops with the wires in contact at the point of crossing, said loops partly overlapping each other in proximity to the edges of the stay and being intertwined by the portions between the loops being twisted together, the ends of oppositely disposed loops lying side by side on the same face of the stay and in the same plane and abutting on their outer sides, the portions between the loops being tightly intertwined thereby holding the abutting portions in closely embracing positions and preventing the two rows of loops being moved one within the other.

DAVID SCHULER.

Witnesses:
E. E. FOWLER,
A. J. DEWEY.

Copies of this patent may be obtained for five cents each, by addressing the "Commissioner of Patents, Washington, D. C."